United States Patent
Shaw et al.

(10) Patent No.: US 7,133,590 B2
(45) Date of Patent: Nov. 7, 2006

(54) IR SUPERCONTINUUM SOURCE

(75) Inventors: Leslie B. Shaw, Woodbridge, VA (US); Jasbinder S. Sanghera, Ashburn, VA (US); Ishwar D. Aggarwal, Fairfax Station, VA (US); Peter A. Thielen, Landover Hills, MD (US); Fred Kung, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 118 days.

(21) Appl. No.: 11/086,731

(22) Filed: Mar. 17, 2005

(65) Prior Publication Data

US 2006/0210227 A1    Sep. 21, 2006

(51) Int. Cl.
G02B 6/00    (2006.01)
G02B 1/365   (2006.01)
H01S 3/00    (2006.01)

(52) U.S. Cl. ........................................ 385/122; 359/332
(58) Field of Classification Search ................ 385/122; 359/332
See application file for complete search history.

(56) References Cited

U.S. PATENT DOCUMENTS

| | | | |
|---|---|---|---|
| 6,097,870 A * | 8/2000 | Ranka et al. | 385/127 |
| 6,611,643 B1 * | 8/2003 | Birk et al. | 385/33 |
| 6,796,699 B1 * | 9/2004 | Birk et al. | 362/556 |
| 6,856,737 B1 * | 2/2005 | Parker et al. | 385/122 |
| 6,928,227 B1 | 8/2005 | Shaw et al. | |
| 7,092,086 B1 * | 8/2006 | Knebel | 356/301 |
| 2002/0050564 A1 * | 5/2002 | Birk et al. | 250/306 |
| 2005/0122580 A1 * | 6/2005 | Birk et al. | 359/389 |
| 2006/0050749 A1 * | 3/2006 | Setzler | 372/22 |

OTHER PUBLICATIONS

Rakich et al. "Broadband supercontinuum based measurements of high-index contrast bandgap devices from 1 to 2 microns." Lasers and Electro-Optics Society, 2004. LEOS 2004. vol. 2, Nov. 2004, pp. 813-814.*
Shaw et al. "Mid-wave IR and long wave IR laser potential of rare-earth doped chalcogenide fiber." IEEE Journal of Quantum Electronics. vol 37, Issue 9, Sep. 2001. p. 1127-1137.*
A. Ferrando, E. Silvestre, J.J. Miret et al, "Designing a Photonic Crystal Fibre with Flattened Chromatic Dispersion", Electron Lett., vol. 35 No. 4, pp. 325-327 (1999).
A. Ferrando, E. Silvestre, P. Andres, J.J. Miret, M.V. Andres, "Designing the properties of Dispersion Flattened Photonic Crystal Fibers", Optics Express, vol. 9, No. 18, pp. 687-689 (2001).

(Continued)

Primary Examiner—John D. Lee
Assistant Examiner—Rhonda S. Peace
(74) Attorney, Agent, or Firm—Aisha Ahmad; John J. Karasek

(57) ABSTRACT

This invention pertains to a device for broadening optical wavelength in the 2–14 μm region comprising a light source and a highly nonlinear chalcogenide fiber associated therewith whereby a light signal is passed from the light source into the fiber wherein and through interactions between the light signal and the material, bandwidth of the light signal is broadened in the 2–14 μm region.

20 Claims, 4 Drawing Sheets

OTHER PUBLICATIONS

J.M. Dudley, L. Provino, N. Grossard, H. Maillotte, "Supercontinuum Generation in Air-Silica microstructured fibers with Nanosecond and Femiosecond Pulse Pumping", J. Opt. Soc. Amer. B., vol. 19., No. 4, pp. 765-771 (2002).

P.A. Chambert, S.V. Popov, J.R. Taylor, "Generation of multiwatt, Broadband continua in Holey Fiber", Opt. Lett., vol. 27, No. 2, pp. 122-124 (2003).

A.V. Avdokhin, S.V. Popov, and J.R. Taylor, "Continuous Wave, High Power, Raman Continuum Generation in Holey Fiber", Opt. Lett., vol 28, No. 15, pp. 1353-1355 (2003).

P.A. Thielen, L.B. Shaw, L.S. Sanghera, and I.D. Aggarwal. "Modeling of a mid-IR Chalcogenide Fiber Raman Amplification", Opt. Lett., vol. 11, No. 24, pp. 3248-3253 (2003).

P.A. Thielen, L.B. Shaw, P.C. Pureza, V.Q. Nguyen, J.S. Sanghera, and I.D. Aggarwal. "Small-Core As-Se Fiber for Raman Amplification", Opt. Lett. vol. 28, pp. 1406-1408 (2003).

J.M. Harbold, F.O. Ilday, F.W. Wise, J.S. Sanghera, V.Q. Nguyen, L.B. Shaw, and I.D. Aggarwal, "Highly Nonlinear As-S-Se Gasses for all Otical Switching", Opt. Lett., vol. 27, pp. 119-121 (2002).

* cited by examiner

IR SUPERCONTINUUM SOURCE

BACKGROUND OF THE INVENTION

1. Field of the Invention

This invention pertains to optical supercontinuum generation or broadening of bandwidth of an optical signal whereby wavelength of the signal is broadened between about 2 and 14 microns.

2. Description of Related Prior Art

In supercontinuum generation, pulses of femtoseconds (fs) to nanoseconds (ns) are spectrally broadened by various nonlinear processes, including self phase modulation, stimulated Raman scattering and four wave mixing, dependent on the pump temporal properties and the dispersion slope of the fiber to create a light continuum much broader in wavelength than the pump bandwidth. While supercontinuum generation is possible by focusing a high intensity light into a nonlinear medium, much broader bandwidths and significantly lower thresholds are possible when the pump is focused into an optical fiber where the guiding characteristics of the fiber allow long pump interactions with the nonlinearities of the fiber materials.

Supercontinuum generation is possible in normal optical fiber or dispersion shifted fiber, however, to achieve maximum supercontinuum bandwidth and lowest supercontinuum threshold, the pump wavelength must be near the zero dispersion point or in the anomalous despersion region of the fiber. The use of photonic crystal fiber meets these criteria and allows lower thresholds and greater bandwidths with proper fiber design.

Photonic crystal fiber is an optical fiber whose guiding solid core region is surrounded by air holes. The air holes create a reduced index cladding which guides light in the solid core region. The advantage of photonic crystal fiber over conventional core/clad fiber is that the dispersion of the fiber can be easily tailored by manipulating cladding microstructured hole size and periodicity as well as core size. In addition, very small core sizes are possible leading to high power densities and resulting in increased nonlinearities in the fiber. For supercontinuum generation, this allows the photonic crystal fiber to be tailored to the pump to maximize the supercontinuum generation and minimize the threshold.

Supercontinuum generation has been demonstrated in silica photonic crystal fiber in the visible and near infrared. In silica photonic crystal fiber, however, the multiphonon edge of silica glass limits the transmission window in the infrared. This, in turn, limits the extent of spectral broadening in the infrared so that, to date, supercontinuum spectra have only been able to span from about 400 nm to about 2.2 µm.

Many applications exist for bright broadband infrared sources beyond about 2 µm. Of particular interest are light sources in the chemical and biological "fingerprint region" from 3–12 µm for biological and chemical sensing and sources within the atmospheric transmission windows from 2–5 µm and 8–12 µm for infrared countermeasures and certain radar (LIDAR) applications. Other applications for such sources include infrared illuminators and infrared sources for hardware-in-the-loop testing. Supercontinuum sources in the infrared would enable these applications.

Unfortunately, transmission limitations of the silica glass matrix of silica limits the supercontinuum generation to less than about 2 µm. For supercontinuum generation in the infrared, alternate technologies and materials are needed.

As disclosed herein, it has been demonstrated that supercontinuum generation in the infrared is possible in chalcogenide based fiber. Chalcogenide glass is highly transmissive in the infrared and thus spectral broadening is not limited by the multiphonon edge, as in silica. Also, chalcogenide glass has much higher nonlinearities that silica glass and thus efficient supercontinuum generation is achievable with lower peak powers and shorter fiber lengths than silica. These high nonlinearities of chalcogenide glass even allow efficient supercontinuum generation with continuous wave (CW) laser sources. Nonlinearity of silica is about $2.5 \times 10^{-20}$ m/W whereas nonlinearity of a chalcogenide is at least 100 times higher.

OBJECTS AND SUMMARY OF THE INVENTION

It is an object of this invention to broaden bandwidth of a light emanating from a chalcogenide solid core glass fiber.

It is another object of this invention to use a chalcogenide glass fiber that has sufficient optical transmission, sufficient nonlinearity, and proper dispersion to broaden spectral width of a light signal and thus make possible the achievement of high brightness infrared sources and the use of shorter length fiber.

It is another object of this invention to broaden spectral width of a coherent light source using a high nonlinearity chalcogenide glass fiber.

It is another object of this invention to design optical high nonlinearity glass fiber in order to tailor fiber dispersion in the anomalous dispersion region for optimizing bandwidth spread.

It is another object of this invention to use high nonlinearity chalcogenide glass fiber with smaller core sizes in fabrication of a photonic crystal fiber to allow for efficient supercontinuum generation using lower power pulse and continuous wave laser sources.

It is another object of this invention to use suitable pump wavelength to generate broadband light in the mid infrared range of about 2–14 µm.

This and other objects can be attained by a device characterized by a glass fiber with a highly nonlinear solid core material and having dispersion so that optical transmission is in the infrared region of about 2–14 µm.

DETAILED DESCRIPTION OF THE INVENTION

Figure 1:
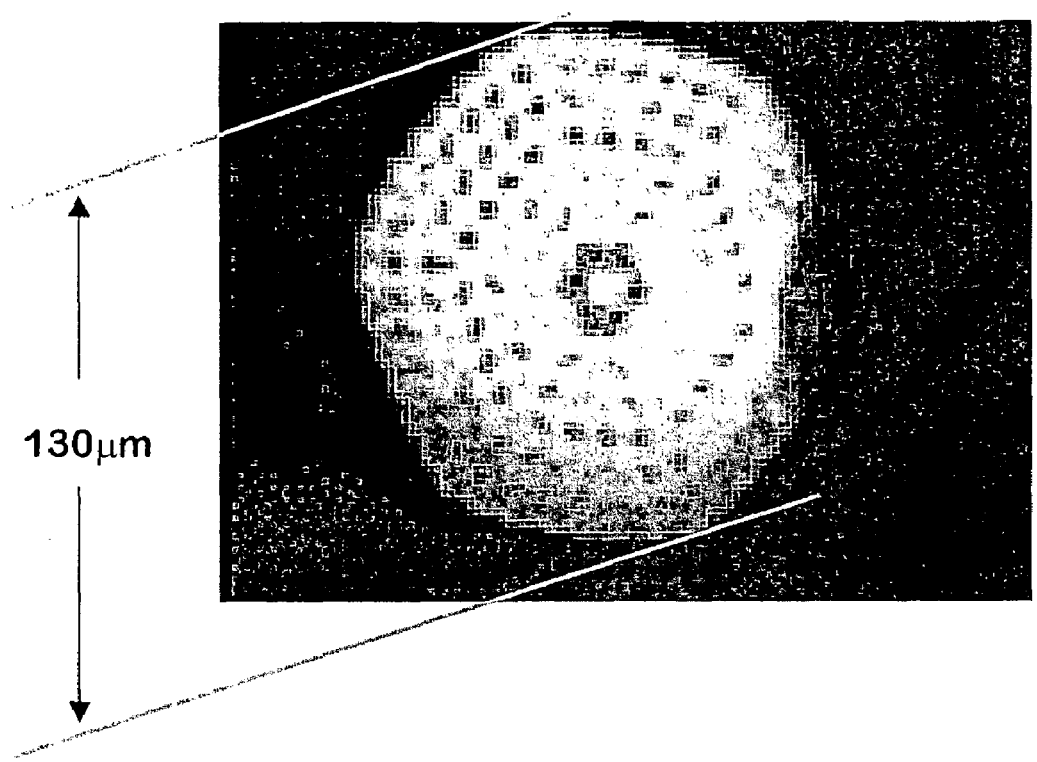
FIG. 1 illustrates a photonic crystal fiber made of chalcogenide glass.

This invention pertains to achieving high brightness broadened infrared sources. The invention involves using high nonlinearity infrared transmissive chalcogenide glass fiber, particularly photonic crystal fiber, to generate a supercontinuum from an optical source. By controlling the core size, cladding hole size and pitch of the chalcogenide fiber, the dispersion of the fiber can be tailored to produce low or anomalous dispersion at the pump source wavelength to maximize the wavelength spread in supercontinuum generation. The high nonlinearity of the chalcogenide glass coupled with the small core sizes possible in the photonic crystal fibers allows highly efficient supercontinuum generation with low peak power pulses and continuous wave laser sources. By choosing a suitable pump wavelength, chalcogenide fiber supercontinuum sources can generate broadband light in the mid and long wave infrared from about 2–14 µm. This region is currently unreachable by supercontinuum sources based upon silica due to the limited transmission of the silica glass matrix of these fibers. Generally speaking, brightness over prior art devices is on the order of at least 100 times brighter and bandwidth widening is typically in excess of 100% of the pump bandwidth.

For the device to work, a number of conditions must be met:
(a) power density must be high enough, and typically it is greater than 1 W/cm$^2$
(b) optical fiber loss must be low enough, and typically it is less than 1 dB/m;
(c) nonlinearity of the fiber material must be high enough, and typically it is greater than about 100 times that of silica ; and
(d) dispersion of the fiber should be in the anomalous region or at a zero point dispersion, since at normal dispersion, wavelength broadening is compromised.

Chalcogenide glass is a vitreous material composed of the chalcogen elements of Group VI of the Periodic Table, i.e., sulfur, selenium and tellurium. These elements are usually mixed with elements of Groups IV and V to form the familiar compound glasses. More particularly, chalcogenide glasses are made from mixtures containing at least one of sulfur, selenium, and tellurium. Other elements can be added. Examples of other elements that can be combined with at least one chalcogen element include germanium, arsenic, and antimony.

Chalcogenide glass typically contains at least about 25 mole percent, and at least 50 mole percent of one or more of the three chalcogen elements. The presence of tellurium in the glass composition has been found to allow transmission at longer wavelengths in the infrared region. While sulfide fibers, such as $As_2S_3$, transmit in the region of about 1–6 µm, the transmission window is increased to beyond 10 µm by including the heavier chalcogenide element tellurium. Glasses containing high levels of tellurium generally transmit in the 2–14 µm region.

The use of chalcogenide fibers is advantageous not only for the wide transittance range but also for chemical durability and strength. Although chalcogenide glass cannot be used in strongly basic environment because it undergoes chemical attack, there are numerous environments where chalcogenide fibers can be used. For instance, chalcogenide glass does not react with water, unlike fluoride glass, and can, therefore, be used in aqueous environments. Additionally, chalcogenide glass can be used in acidic and organic environments.

Solid core fibers can also be made from mixtures of halide and chalcogenide glass components and are called chalcohalide glasses. Fluorine glasses have relatively poor chemical durability and low glass transition temperatures whereas chalcogenide glasses are well known for their chemical durability but their relatively high refractive indices give rise to high reflectivities from the glass surface. Chalcohalide glasses, such as approximately 40/60 mixtures of arsenic and sulfur with about 5% of a halide, such as iodine, bromine, chlorine and/or fluorine have some beneficial characteristics of both glasses. The structural aspect of these glasses is interesting from a fundamental viewpoint since chalcogenide glasses are predominantly covalent and halide glasses are predominantly ionic in character. As used herein, the term "chalcogenide" includes "chalcohalide."

Chalcogenide glass is strong enough for the purpose herein. The strength is of particular significance in fabrication of the photonic crystal fiber where channel wall thickness can be very thin requiring a material of considerable strength to keep the walls from collapsing.

Although a material other than chalcogenide can be used as long as it is highly nonlinear and meets other prerequisites, it has been determined that a chalcogenide material is the material of choice for purposes herein.

The property of chalcogenide glass, which makes it particularly suitable for supercontinuum generation, is its high nonlinearity when compared to silica glass. Third order nonlinearity, $\chi^{(3)}$, of certain chalcogenide glass is more than about 1000 times larger than silica glass.

Chalcogenide glass fibers suitable herein include fibers with O.D. typically in the range of 50–1000 µm, and more typically in the range of 100–500 µm. Core size is in the range of 1–100 µm in diameter, but typically range from smaller cores of about 1 µm in diameter to larger cores of about 50 µm in diameter. Generally speaking, the smaller the core the higher the energy density and the broader the bandwidth, for a given power. In order to keep light within the core, its refractive index is kept higher than that of the clad.

Glass fiber that is especially suitable herein since its design facilitates dispersion tailoring, is the photonic crystal fiber 16 shown in FIG. 1, characterized by a solid core containing openings. The function of the openings is to reduce the effective refractive index and tailor the dispersion. The diameter from apex to the opposite apex of the photonic crystal fiber 16 shown in FIG. 1, was 130 µm. Although the photonic crystal fiber is shown with one course of openings, it should be understood that any number of courses can be provided, as desired, and the openings need not be in any specific arrangement. The openings are typically from a fraction of a micron to about 10 microns in diameter and on a center-to-center spacing or periodicity is typically 1–10 microns.

Figure 2A:
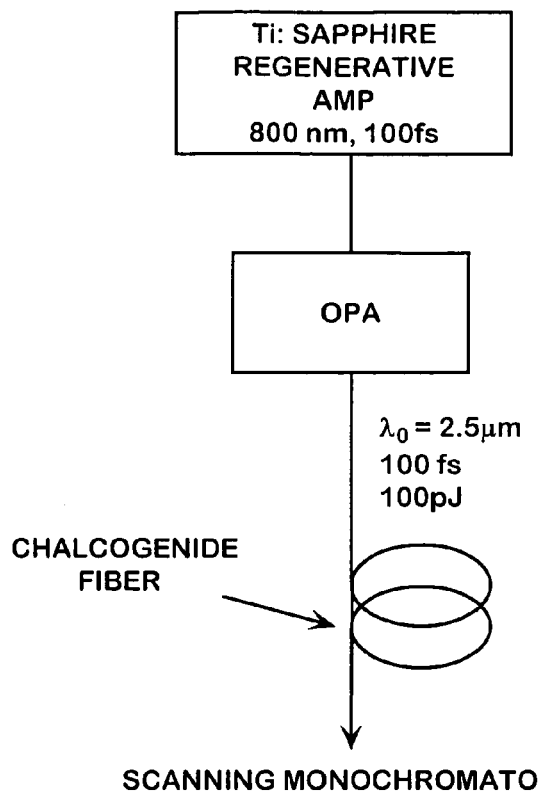
FIG. 2A is the laser arrangement that produced the supercontinuums of FIG. 2.
Figure 2:
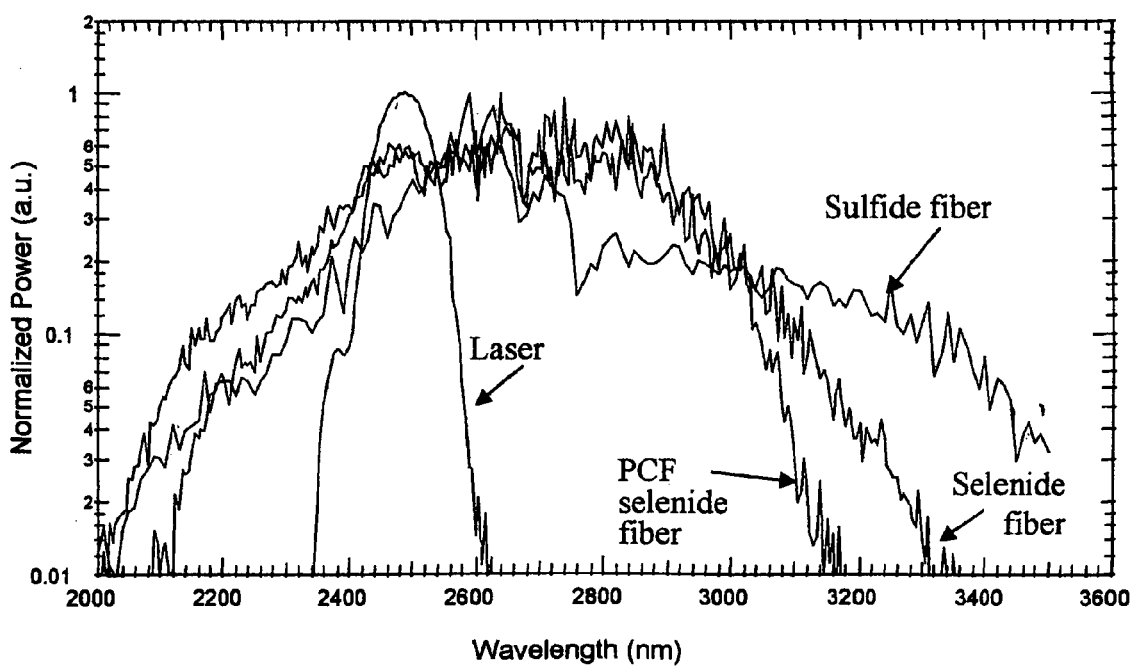
FIG. 2 is a graph of wavelength and normalized power for a photonic crystal selenide glass fiber, a selenide glass fiber, and a sulfide glass fiber in connection with generation of a supercontinuum.

Chalcogenide solid core/clad glass fiber can be used for generating supercontinuum as well as the photonic crystal fibers. As shown in FIG. 2, which is a graph of wavelengths in nm and normalized power in a.u., a 7 µm core selenide fiber yielded a supercontinuum about 2000–3400 nm; sulfide fiber with a 7 µm core yielded a supercontinuum of about 2000–3600 nm; and a selenide photonic crystal fiber with a 10 µm core yielded a supercontinuum of about 2100–3200 nm. In FIG. 2 experiments, the laser pump had a wavelength of about 2340–2620 nm The particulars of the set-up that yielded the supercontinuums of FIG. 2 are given in FIG. 2A.

Dispersion is the wavelength dependence of the velocity of light in a fiber and can be divided into normal dispersion and anomalous dispersion. In normal disppersion, longer wavelength components travel faster than shorter wavelength components while in the anomalous dispersion region of a fiber, the reverse is true—shorter wavelength components travel faster than longer wavelength components. The zero dispersion point separates these two regions. All wavelengths around the zero dispersion point travel at the same speed. Fiber design can be used to tailor fiber dispersion. For photonic crystal fiber, in particular, the dispersion can be tailored so that the zero dispersion point can be at any chosen wavelength within the 2–14 μm transmission region and thus maximize supercontinuum generation by facilitating interactions between wavelengths and the nonlinear fiber material.

Generation of a supercontinuum is based upon the interaction of the different wavelength components of the pump, pump and signal, or signal and signal with the nonlinear material. An interaction of a wavelength or multiple wavelengths with a nonlinear material can yield still other wavelengths. Such interaction eventually leads to generation of a supercontinuum.

The shape and bandwidth of generated supercontinuum is highly dependent upon the dispersion of the fiber. In general, the broadest supercontinuum can be generated by pumping in the anomalous dispersion region of the fiber. Typically, pumping at the zero dispersion point yields narrower supercontinuum with a dip at the zero dispersion point while supercontinuum generated in the normal dispersion region is narrow and smooth. The dispersion dependence of the supercontinuum is due to different nonlinear effects which can occur in the different dispersion regions of the fiber. Thus, the broadness and shape of the supercontinuum can be tailored to thee application by careful design of the dispersion properties of the fiber of the pump wavelength.

Discussion of fiber interaction in the preceding paragraph, also leads to a rational conclusion with respect to the effect of power and length of fiber on generation of a supercontinuum. It makes sense that use of more power results in stronger interactions which leads to generation of a broadened supercontinuum and if a narrower supercontinuum were adequate, then less power would suffice. With the length of fiber, it makes sense that a longer fiber allows for more interactions and therefore, a more broadened supercontinuum. Brightness, i.e., area under the curve, as in FIG. 2, is greater than in the prior art devices, such as glow bars, and light issuing from supercontinuum devices of this invention is directional whereas glow bars issue light in all directions.

Figure 3:
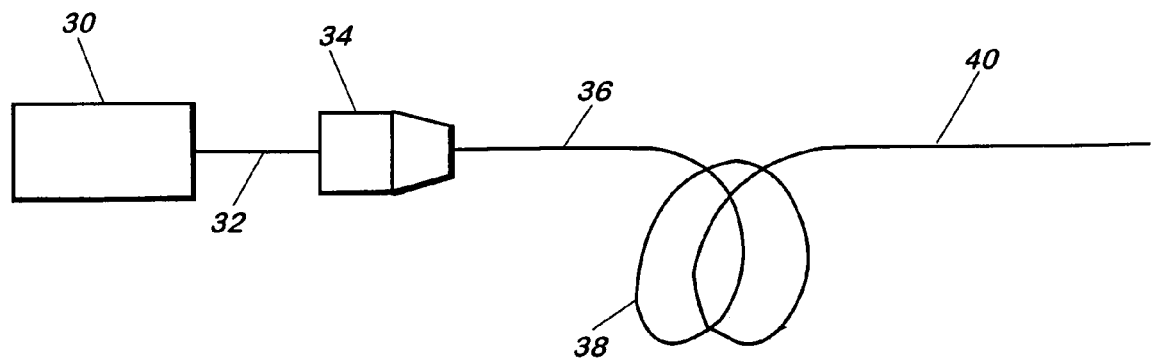
FIG. 3 is a depiction of a typical device for generating a supercontinuum or wavelength broadening.

FIG. 3 is an illustration of a typical set-up device for generating a supercontinuum. The set-up includes an optical source 30, a conduit 32 for conveying an optical signal out of the optical source, a focusing lens 34 connected between the conduit 34 and conduit 36, a chalcogenide fiber connected between conduit 36 and exit 40 whereat the supercontinuum issues from. An optical signal from optical source 30 is sent through conduit 32, then through conduit 36 and into high nonlinearity glass fiber 38 where wavelengths of the light signal are broadened to generate a supercontinuum which issues forth through the exit conduit 40. Length of the fiber 38 is typically in meters, especially 1 meter. Brightness here is typically on the order of milliwatts whereas in the prior art devices, it is typically on the order of microwatts. Power can be supplied by any suitable source, particularly by lasers in pulses or continuously.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

This example demonstrates generation of a supercontinuum using a photonic crystal As—Se glass fiber with a pulse laser light source.

An infrared supercontinuum source consisted of a short pulse infrared pump source and a section of chalcogenide photonic crystal fiber whose dispersion minimum was at a wavelength of about 6 μm, as calculated, was matched as well as it could be to the wavelength of the pump source. FIG. 3 shows a schematic of the supercontinuum source wherein pump wavelength was 2500 nm, 80 fs pulses at power of less than 1 μJ per pulse. The chalcogenide fiber in the supercontinuum source was As—Se based photonic crystal fiber whose cross-section is shown in FIG. 1. The photonic crystal fiber O.D. was about 130 μm and the core size was about 10 μm. Fiber optical loss at 1.5 μm was 4.8 dB/m and the NA was about 0.45. As—Se fiber is highly transmissive in the infrared out to about 11 μm and thus, the generated supercontinuum shown in FIG. 4 was not limited by the transmission edge of the fiber.

Figure 4:
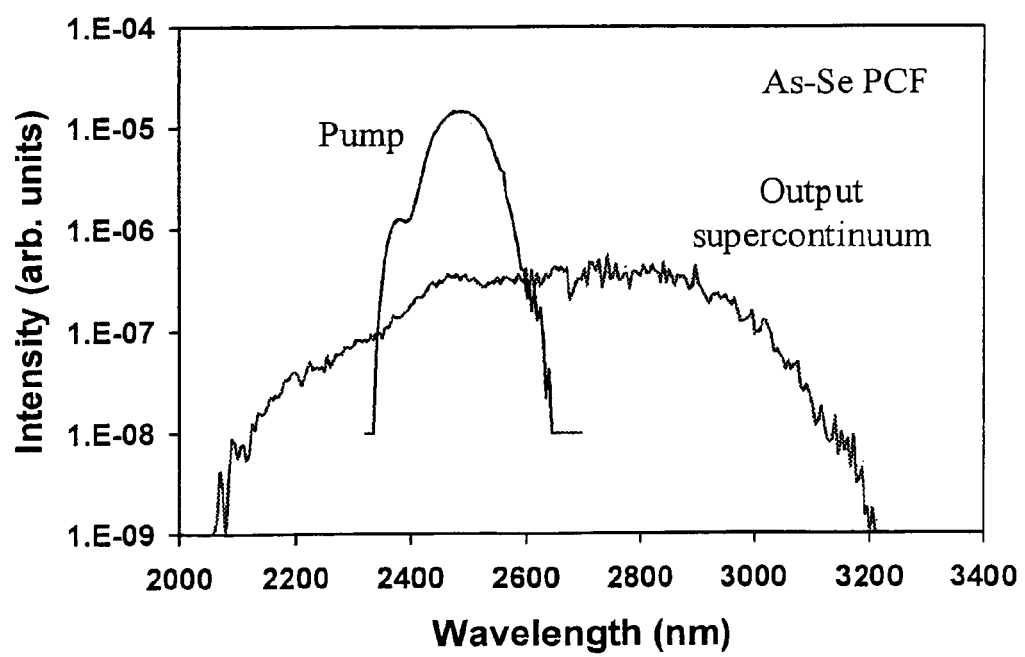
FIG. 4 is a graph of wavelength and intensity output supercontinuum using a chalcogenide photonic crystal fiber.

The optical source was a Spectra-Physics femtosecond laser with a Spectra-Physics OPA-800C that was used to pump the photonic crystal fiber to generate the supercontinuum. The output of the laser was tuned to a wavelength of about 2500 nm and could not be tuned any closer to that of the fiber's zero dispersion wavelength, i.e., about 6 μm. The pump was launched into 1 meter of the fiber. FIG. 4 shows the bandwidth of the initial pump beam at about 2500 nm (2300–2620 nm) and the generated supercontinuum bandwidth at the output end of the fiber extending from about 2100 nm to about 3200 nm.

EXAMPLE 2

This example demonstrates generation of a supercontinuum using a solid core As—Se glass fiber and a pulsed laser light source.

Figure 5:
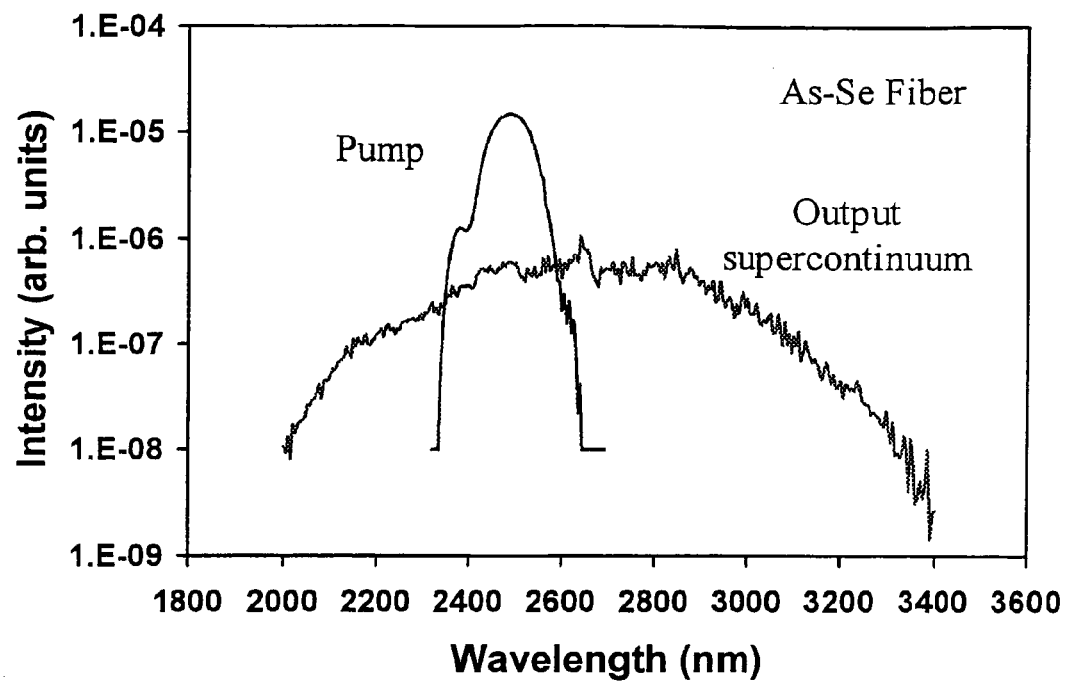
FIG. 5 is a graph of wavelength and intensity of pulsed pumping and output supercontinuum using a chalcogenide fiber.

The same laser pump source was used here as in Ex. 1, operating at about 2500 μm. The pump was launched into 1 meter length As—Se glass fiber with a core size of about 7 μm and the optical fiber loss was on the order of about 1 dB/m at 1.5 μm wavelength. FIG. 5 shows the bandwidth of the supercontinuum at the output of the fiber.

EXAMPLE 3

This example demonstrates generation of a supercontinuum using a solid core of about 7 μm in diameter. As—Se glass fiber and a continuous wave laser.

Figure 6:
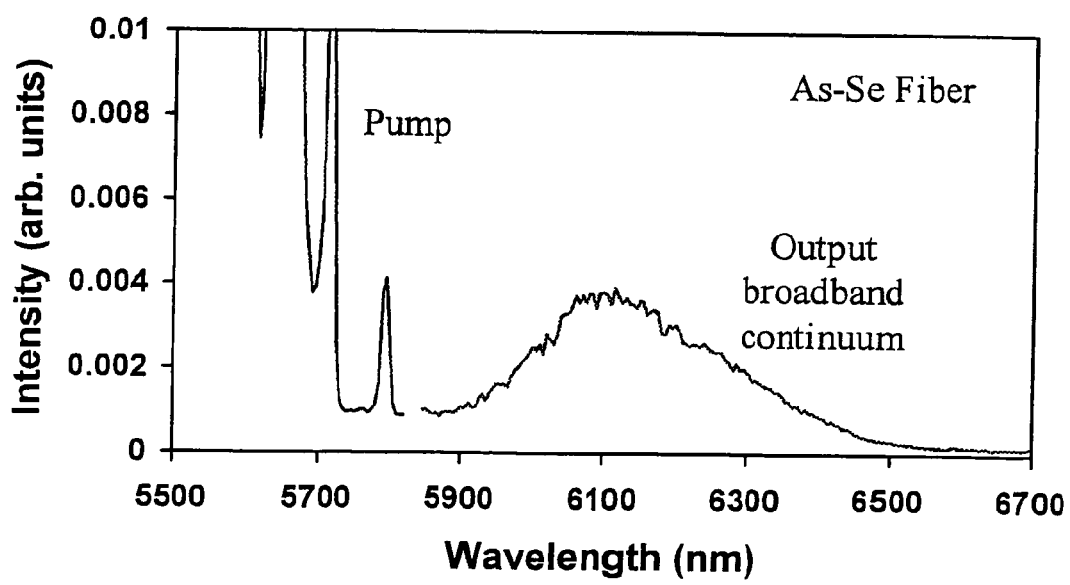
FIG. 6 is a graph of wavelength and intensity of a continuous pump optical source and output supercontinuum using a chalcogenide fiber.

FIG. 6 shows a broadband supercontinuum extending from about 5900 nm to about 6500 μm generated in an As—Se solid core from a continuous wave CO laser pump at about 5400 nm.

While presently preferred embodiments have been shown of the novel device for making high brightness supercontinuum, and of the several modifications discussed, persons skilled in this art will readily appreciate that various additional changes and modifications may be made without departing from the spirit of the invention as defined and differentiated by the appended claims.

What is claimed:

1. A device for broadening an optical wavelength comprising: a light source operable to generate a light signal; and a fiber comprising a nonlinear chalcogenide glass fiber, said fiber transmits in the 2–14 µm range and broadens the bandwidth of the light signal in the 2–14 µm range, via interactions between the light signal and the fiber.

2. Device of claim 1 wherein said fiber has solid core and solid clad around said core.

3. The device of claim 2 wherein said core and clad are of chalcogenide glass.

4. The device of claim 1 wherein said fiber is a photonic crystal fiber composed of a solid chalcogenide core and a chalcogenide clad disposed around said core.

5. The device of claim 4 wherein said fiber has transmission in the range of 2–14 µm.

6. The device of claim 5 wherein said clad contains openings around said core.

7. The device of claim 6 wherein the cross-section of said core is circular, with a diameter of 1–50 µm.

8. The device of claim 7 wherein outside diameter of said fiber is in the range of 50–1000 µm and its dispersion is in the anomalous region.

9. The device of claim 5 wherein the light signal exiting said fiber is directional and its bandwidth is enlarged by at least 100% compared to the bandwidth of light entering said fiber.

10. The device of claim 5 which includes multiple light sources.

11. The device of claim 10 wherein said clad has outside diameter of 100–500 µm.

12. The device of claim 11 wherein brightness of the light signal exiting said fiber is directional and brighter than the prior art glow bar devices.

13. The device of claim 12 wherein dispersion minimum is within the transmission range of 2–14 µm.

14. The device of claim 12 wherein anomalous dispersion is within the transmission of 2–14 µm.

15. A device for broadening wavelengths of a laser pump comprising: a laser light source operable to generate a light; and a chalcogenide glass fiber coupled to said light source, said chalcogenide glass fiber operable to transmit the light in the 2–14 µm range, and further operable to broaden a bandwidth of the light, in the 2–14 µm range by at least 100% by introducing said light source into said fiber.

16. The device of claim 15 wherein said fiber is composed of a chalcogenide core and a chalcogenide clad.

17. The device of claim 16 wherein said clad contains openings around said core.

18. The device of claim 17 wherein said core is circular in cross-section with the core diameter of 1–50 µm and diameter of the openings is 1–10 µm.

19. The device of claim 17 wherein dispersion in the 2–14 µm region is anomalous.

20. The device of claim 17 including multiple light sources.

* * * * *